(12) United States Patent
Bourgier et al.

(10) Patent No.: US 8,474,382 B2
(45) Date of Patent: Jul. 2, 2013

(54) SYSTEM AND METHOD FOR GUIDING A GALVANIZING PRODUCT WIPING DEVICE

(75) Inventors: Pierre Bourgier, Sorbiers (FR); Jean-Jacques Hardy, Irigny (FR)

(73) Assignee: Siemens VAI Metals Technologies SAS, Saint-Chamond (FR)

( * ) Notice: Subject to any disclaimer, the term of this patent is extended or adjusted under 35 U.S.C. 154(b) by 246 days.

(21) Appl. No.: 12/992,747

(22) PCT Filed: May 15, 2008

(86) PCT No.: PCT/FR2008/000673
§ 371 (c)(1),
(2), (4) Date: Nov. 15, 2010

(87) PCT Pub. No.: WO2009/138576
PCT Pub. Date: Nov. 19, 2009

(65) Prior Publication Data
US 2011/0067595 A1 Mar. 24, 2011

(51) Int. Cl.
*B61F 13/00* (2006.01)
*B05C 3/00* (2006.01)

(52) U.S. Cl.
USPC .......................................... 104/139; 118/419

(58) Field of Classification Search
USPC ............ 104/94, 139, 140, 243, 245; 105/155, 105/215.1; 118/419, 665, 708
See application file for complete search history.

(56) References Cited

U.S. PATENT DOCUMENTS

| 3,195,474 | A | * | 7/1965 | Dehne | 104/172.4 |
| 5,934,029 | A | | 8/1999 | Kawai et al. | |
| 6,718,885 | B1 | * | 4/2004 | Risser et al. | 105/30 |
| 2010/0080889 | A1 | * | 4/2010 | Hardy et al. | 427/9 |
| 2011/0186141 | A1 | * | 8/2011 | Bourgier et al. | 137/15.01 |

FOREIGN PATENT DOCUMENTS

| JP | 8260122 A | 10/1996 |
| WO | 03018859 A2 | 3/2003 |

* cited by examiner

*Primary Examiner* — S. Joseph Morano
*Assistant Examiner* — Zachary Kuhfuss
(74) *Attorney, Agent, or Firm* — Laurence A. Greenberg; Werner H. Stemer; Ralph E. Locher

(57) ABSTRACT

A system for guiding a mobile carriage in a frame. The frame has three parallel linear-guiding tracks including a first track extending centrally on the frame and second and third tracks arranged laterally of the first track. The carriage has at least two axes of rotation. A first axis drives at least a first wheel in the first guiding track and a second axis drives at least a second wheel and at least a third wheel, respectively, in the second and third guiding tracks. The two axes of rotation are perpendicular. The description also relates to an associated method. A primary object is to enable the end of a mobile beam, such as a beam carrying a device for wiping a galvanizing product off a steel strip, to perform a guided movement with a high degree of freedom while minimizing mechanical stresses.

9 Claims, 4 Drawing Sheets

SYSTEM AND METHOD FOR GUIDING A GALVANIZING PRODUCT WIPING DEVICE

BACKGROUND OF THE INVENTION

Field of the Invention

The present invention relates to a system and method for guiding in particular a galvanizing agent wiping device, as claimed in the preambles to claims 1 and 8.

The invention relates in particular, but not in a limiting sense, to the guiding of supports of a device for carrying air jet wipers for wiping liquid zinc on a continuous steel strip as it leaves a plating bath of a continuous galvanizing line. Each of the baffles must be disposed at each strip edge. By extension, the invention proposes a solution for guiding and carrying beam ends having freedom of movement imparted by motorized supports at each of the ends. These ends are generally disposed on a system of carriages (such as three-dimensionally motor-controllable displacement tables) which provide at least a locally "ball-joint-like" basic movement of said beam end, such as a wiper retaining beam.

More generally, to improve corrosion resistance in certain applications such as the construction and automotive industries or domestic appliances, the surface of the steel strips is coated with a galvanizing agent (liquid then solid) such as zinc or a zinc-based alloy. This coating is applied on continuous galvanizing lines (along which the strip is conveyed) typically comprising:

- An input section with one or two strip uncoilers, a guillotine shear, a butt welding machine for joining the tail end of a strip originating from one of the uncoilers to the head of the next strip originating from the other uncoiler, thereby ensuring continuous operation of the line, a strip accumulator which returns to the line the strip previously accumulated when uncoiling is stopped upstream of the accumulator to carry out butt welding;
- A cold-rolled strip degreasing or hot-rolled strip pickling section;
- An annealing furnace which also ensures that the strip is kept at a controlled temperature before it enters a molten zinc bath;
- A galvanizing section comprising the zinc bath in which the strip is dipped, then a device for air jet wiping of the liquid zinc, finally an induction alloying furnace, a cooling area and a quenching tank;
- An output section with a skin pass rolling mill, a passivation section, an output accumulator, a shear unit and one or two strip recoilers.

On leaving the furnace, the strip is dipped obliquely into an alloying bath of liquid zinc (as a liquid galvanizing agent), deflected vertically by a bottom roll submerged in the bath, next passes over a so-called anti-crossbow roll designed to correct edge camber of the strip resulting from its passage over the bottom roll, then passes over a so-called pass line roll for adjusting its vertical path as it leaves the bath. When it leaves the plating bath, the strip is covered, on both faces, with a coating of liquid zinc of more or less constant thickness. It is necessary to adjust transversely and longitudinally the thickness of the zinc deposited to a value a near as possible to the desired objective which combines performance in terms of anti-corrosion protection with optimization of the amount of zinc used. For this purpose devices for air wiping the liquid zinc are disposed on either side of the strip surface in order to ensure that the liquid zinc is wiped on both faces of the strip.

Such air wiping systems have been extensively described, for example, in JP 08-2260122 which emphasizes the need to center the strip perfectly between two wipers either side of the strip. Indeed, the wiping effect is very sensitive to the blown air pressure and the distance between blower jets and strip. In order to ensure correct centering, each of the two wipers is equipped at each end with an independent control system, the motors of which are controlled by zinc thickness measuring devices located downstream in the direction of travel of the strip.

In this connection, WO 03/018859 describes a wiper positioning system with four motors controlled separately as a function of the measured zinc thickness. It also takes account of the effect on centering of the natural curvature of the strip commonly known as the crossbow effect.

Moreover, the distance between the surface of the liquid plating bath and the wipers is likewise a parameter affecting the control of the wiping operation. Consequently, each of the wipers located either side of the strip usually has, at each of its ends, the following positioning means:

- A height adjustment for vertically displacing each end of each wiper (or by extension its retaining beam). As a general rule and barring malfunctions, the movement of each end is synchronous;
- An adjustment, in a horizontal plane, of the distance with respect to the strip for horizontally displacing each end of each wiper (or its retaining beam) in a direction perpendicular to the surface of the strip. Taking into account the position of the plane of the strip leaving the plating bath and any "crossbow", the movements of each end are generally differential.
- An adjustment in a horizontal plane parallel to the plane of the strip, ensuring good relative horizontal positioning of the ends of the air jet slits of the two wipers. This adjustment, differential by definition, is generally a factory preset.

Some of these three movements of each end of each of the wipers can be adjusted independently by actuators and it is therefore necessary to cater for the fixing elements of each end. Moreover, all the actuators may be subject either to mechanical malfunction or loss of control liable to cause exaggerated misalignments of one end with respect to the other and to damage all or part of the wiping device. Lastly, the temperature variations occurring when the wiping device is placed above the bath of molten zinc produce significant expansion and a corresponding increase in the length of the wipers which must be contained without generating stresses in the wipers themselves or in their supports.

BRIEF SUMMARY OF THE INVENTION

An object of the present invention is to propose a guiding system, and an associated method, enabling an end of a movable beam, such as a beam carrying a wiper of a galvanizing agent on a steel strip, to be displaced in a guided manner with a high degree of freedom while minimizing any mechanical stress.

To achieve this, a device for carrying the ends of wipers of an air jet or electromagnetic field strip wiping installation must be able to provide said wipers with the desired degrees of freedom to allow, without stress, their operating positions to be adjusted, their expansions to be contained and the consequences of any failures of their dynamic actuators to be considerably limited. The system envisioned by the invention must therefore be suitable for all types of wiping devices whose ends are moved by independent carrying actuators providing at least vertical height adjustment, horizontal adjustment perpendicular to the plane of the strip and horizontal adjustment parallel to the plane of the strip passing between the wipers.

It must also allow each of the ends carried by a beam the following four degrees of freedom:
- A possibility of supporting an height deviation of one end with respect to the other in a vertical plane parallel to the plane of the strip,
- A possibility of supporting a position deviation of one end with respect to the other in a horizontal plane perpendicular to the plane of the strip,
- A possibility of withstanding the combined effect of an altitude deviation in a vertical plane parallel to the plane of the strip and a position deviation in a horizontal plane perpendicular to the plane of the strip,
- A possibility of maintaining movement of the wiper assembly along its longitudinal axis in all cases.

To provide these four degrees of freedom, such an end guiding system must comprise:
- A horizontal first pivot axis perpendicular to the longitudinal axis of the wiper,
- A vertical second pivot axis perpendicular to the longitudinal axis of the wiper and perpendicular to the first pivot axis,
- Linear guiding aligned to the longitudinal axis of the wiper.

The invention thus proposes two solutions in the form of a guiding system and a guiding method as claimed.

Such a system consists of a system for guiding a movable carriage in a frame wherein:
- the frame is equipped with three parallel linear guiding tracks, a first of which extends centrally on the frame and a second and third track are disposed laterally with respect to the first track,
- the carriage has at least two axes of rotation, a first axle driving at least one first wheel in the first guiding track and a second axle driving at least one second and at least one third wheel respectively in the second and the third guiding track,
- the two axes of rotation are perpendicular.

Since the movement of the strip is generally vertical as it leaves the galvanizing bath, the beam supporting a wiper of one side of the strip is displaced around and close to the horizontal. According to this configuration, linear guiding aligned to the longitudinal axis of the wiper is therefore provided by a so-called "vertical" guiding track in which a first wheel rotatably mounted about a vertical (or almost vertical) axis travels, and by two horizontal guiding tracks located either side of the vertical guiding track and parallel thereto and each comprising the second and the third wheel, rotatably mounted about a common horizontal axis, moving between the two horizontal strips of each of the horizontal guiding assemblies.

For the carriage, it is provided that the vertical axis of the first wheel interlocks with the horizontal axis common to the second and third wheel and that each end of the wiper (or of it supporting beam) is interlocked with the carrying carriage by a bearing surface perpendicular to the axis of rotation of the first wheel. Such a carriage combining these characteristics can be implemented by means of a single-part unit encapsulating the two intersecting axes of rotation and comprising a means of fixing or embedding the end of the beam. The first wheel is pivotable, along its guiding track, about the horizontal axis of rotation of the second and third wheel (perpendicular to the longitudinal axis of the wiper), thereby advantageously providing the possibility of supporting a height deviation of one end of the wiper with respect to the other in a vertical plane parallel to the plane of the strip.

The second and the third wheel are pivotable, in their respective guiding tracks, about the vertical axis of rotation of the first wheel (perpendicular to the longitudinal axis of the wiper and perpendicular to the first pivot axis mentioned above), thereby providing the possibility of supporting a position deviation of one end of the wiper with respect to the other in a horizontal plane perpendicular to the plane of the strip.

This system therefore provides all the desired degrees of freedom while also relieving the stresses mentioned in connection with the prior art.

It is of course possible to implement the carriage in different ways. The system presented here is therefore one of the possibilities suitable for a method for guiding one end of a beam moving three-dimensionally wherein said end is rigidly fixed to the carriage. The method likewise provides that another end of said beam is rigidly fixed to another carriage, basically identical to the carriage of the opposite end. The guiding method is therefore then suitable for positioning wiper ends constituting two distinct beams suitable for air jet or magnetic field wiping either side of a moving strip and wherein said ends and their respectively fixed carriages are moved by a plurality of independent actuators providing vertical height adjustment, horizontal adjustment perpendicular to the plane of the strip and horizontal adjustment parallel to the plane of the strip (therefore double pivoting and linear guiding as mentioned above).

The advantages of the invention are likewise set forth in the set of sub-claims.

Exemplary embodiments and applications will be now described with reference to the accompanying drawings:

DESCRIPTION OF THE INVENTION

Figure 1:
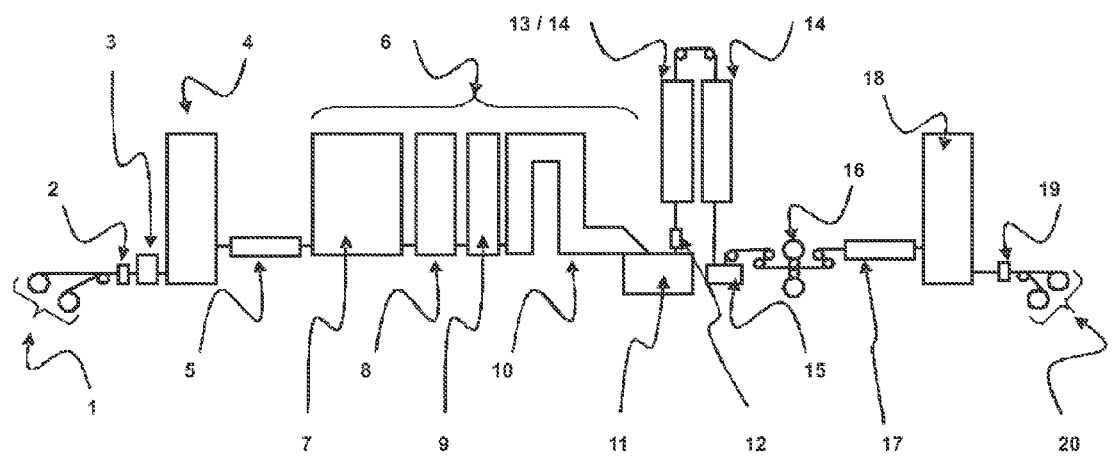
FIG. 1 Arrangement of a continuous steel strip drip-galvanizing line,
FIG. 2 Arrangement of the zinc bath zone,
FIG. 3 Air jet wiping principle,
FIG. 4a, 4b Arrangement of an air jet wiping device,
FIG. 5 Guiding system according to the invention,
FIG. 6a,6b Guiding system according to the invention in beam inclination mode,
FIG. 7a,7b Guiding system according to the invention in beam deviation mode.

FIG. 1 shows a typical arrangement of a continuous steel strip dip-galvanizing line comprising, in the sequential conveying direction of the strip along the line:
- An input section with one or two strip uncoilers (1), a guillotine shear (2), a butt welding machine (3) for joining the tail end of a strip or originating from one of the uncoilers to the head of the next strip originating from the other uncoiler, thereby ensuring continuous operation of the line, a strip accumulator (4) which returns to the line strip previously accumulated when uncoiling is stopped upstream of the accumulator to carry out butt welding;
- A cold-rolled strip degreasing or hot-rolled strip pickling section (5);
- An annealing furnace (6) comprising a heating section (7), a holding section (8), a cooling section (9) and a section (10) (such as a furnace) for keeping the strip at a controlled temperature before it enters a molten zinc bath;
- A galvanizing section as such with the zinc bath (11) in which the strip is dipped, a liquid zinc air wiping device (12), and finally an induction alloying furnace (13), a cooler (14) and a quenching tank (15);

An output section with a skin pass rolling mill (16), a passivation section (17), an output accumulator (18), a shear unit (19) and one or two strip recoilers (20).

Figure 2:
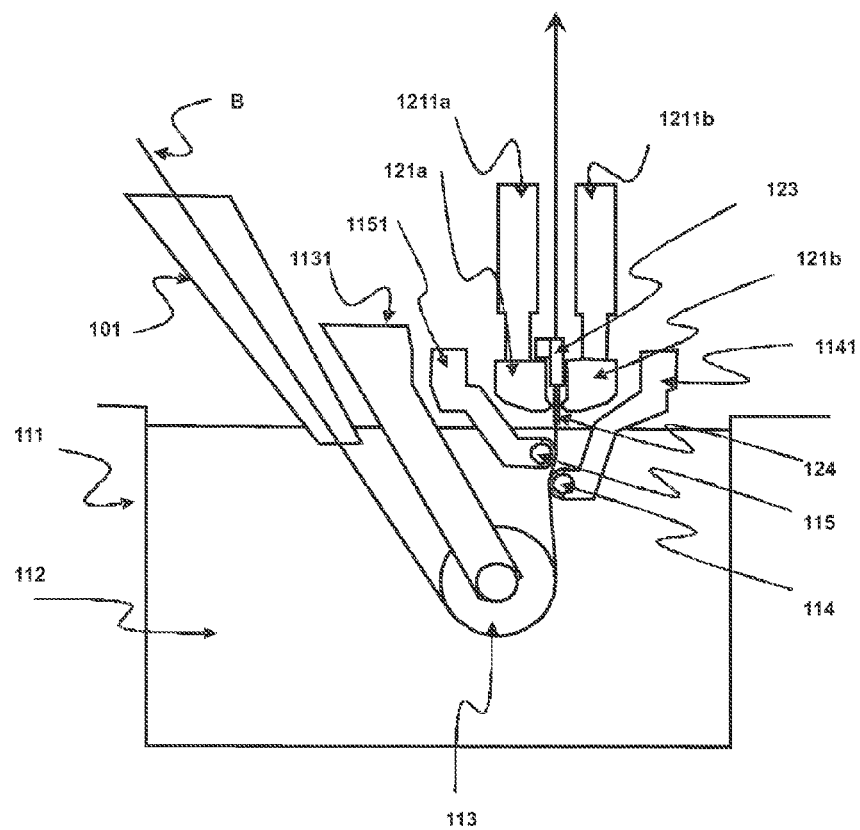

FIG. 2 shows a zinc bath zone arrangement coupled to a zinc wiping device according to FIG. 1. A steel strip (13) leaves a furnace (10) by a sleeve (101) descending obliquely into a liquid bath (112) comprising a liquid galvanizing agent and contained in a plating tank (111) designed for depositing the galvanizing agent on each side of the strip. The strip is deflected vertically by a submerged roll (113) known as the "bottom roll" and supported by two arms (1131), then comes into contact with a so-called anti-crossbow roll (114) itself supported by two arms (1141) integral or not with (1131) and designed to correct the edge camber of the strip resulting from its passage over the bottom roll, then over a so-called pass line roll (115) supported by two arms (1151) and designed to adjust its vertical path as it leaves the bath. Thus the strip then leaves the plating bath vertically before entering an air wiping device (12). The strip thus leaves the plating bath vertically to pass between two wipers (121a) and (121b) supplied by compressed air (1211a) and (1211b) over at least the entire width of the strip. A retaining arm (123), parallel to the wipers and mounted between them, supports baffles (124) limiting the turbulence of the opposing wipers at the strip edges.

Figure 3:
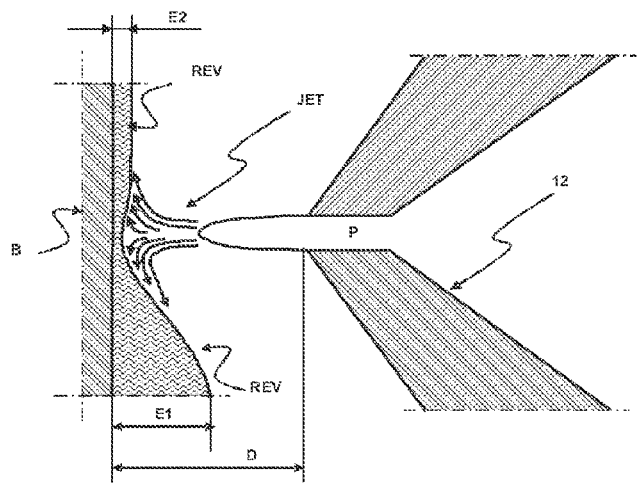

FIG. 3 shows a principle of air jet wiping on one of the sides of the strip (B), said principle being applicable within the scope of the invention. A jet of air (JET) from the wiping device (12) according to FIG. 2 subjects the liquid galvanizing coating (REV) of the strip (B) to a constriction effect which causes its thickness prior to solidification to co from a value ($E_1$) on entry under the jet to another value ($E_2$) on exit. A distance (D) between the vertically moving strip and an air outlet section of the wipers, the air pressure (P) and the sped of the strip are critical variables which influence the wiping operation and therefore the desired properties of the galvanizing coating, such as its final thickness when it leaves the wiping device.

Figure 4A:
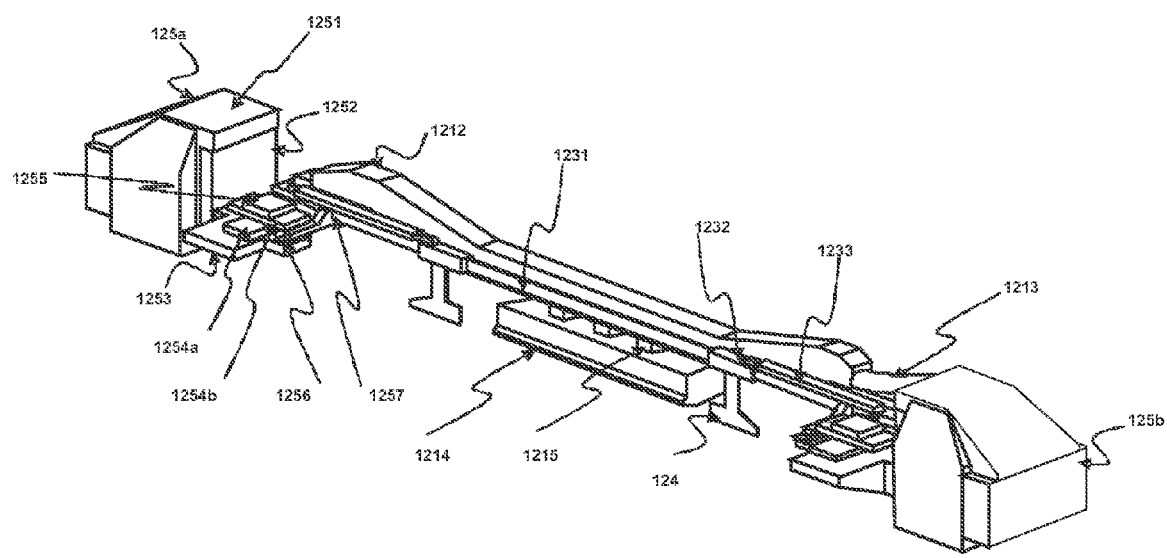

FIG. 4a shows a perspective view of a complete wiping unit as an arrangement of an air jet wiping device. For reasons of clarity, a single wiper has been illustrated. This unit comprises two carrying systems (125a) and (125b) located to the side of the strip edges and each comprising a support (1251) to which is fixed a vertical displacement table (1252) supporting a base in the form of a plate (1253). This plate (1253) is equipped with two sets of horizontal displacement tables each comprising a displacement table (1254a) acting in a direction perpendicular to the plane of the strip and a second table (1254b) acting perpendicularly to the first. A support (1255) integral with the base (1253) receives one end of one of the beams supporting a wiper (1212), the other opposite end of the same beam being supported in the same manner. This beam (1212) receives the compressed air via a main duct (1213) and injects it into a diffuser box (1214) via distribution ducts (1215). The plate (1253) also comprises a horizontal displacement table (1256) acting in a direction perpendicular to the plane of the strip and carrying a support (1257) of the baffle retaining unit (123). This retaining unit comprises at least one arm (1231) on which two carriages (1232) move, actuated by a displacement device (1233), e.g. a jack. Each carriage (1232) carries a baffle (124).

Figure 4B:
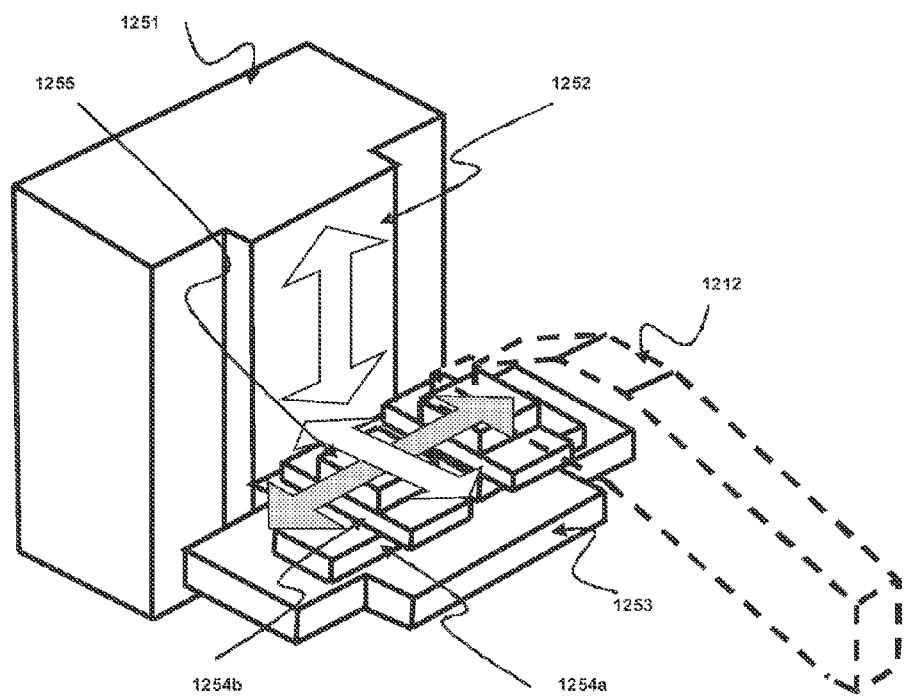

FIG. 4b shows in greater detail the arrangement of an air jet wiping device in the vicinity of different wiper positioning tables located at the beam ends (1212) supporting the wipers. A vertical displacement table (1252) carried by a support (1251) actuates a plate as a base (1253) which itself carries two horizontal displacement tables (1254a) acting perpendicularly to the plane of the strip and two horizontal displacement tables (1254b) acting perpendicularly to the tables (1254a). All the displacement tables (1254a, 1254b) actuate other supports (1255) which carry the ends of the diffuser beams (1212).

Figure 5:
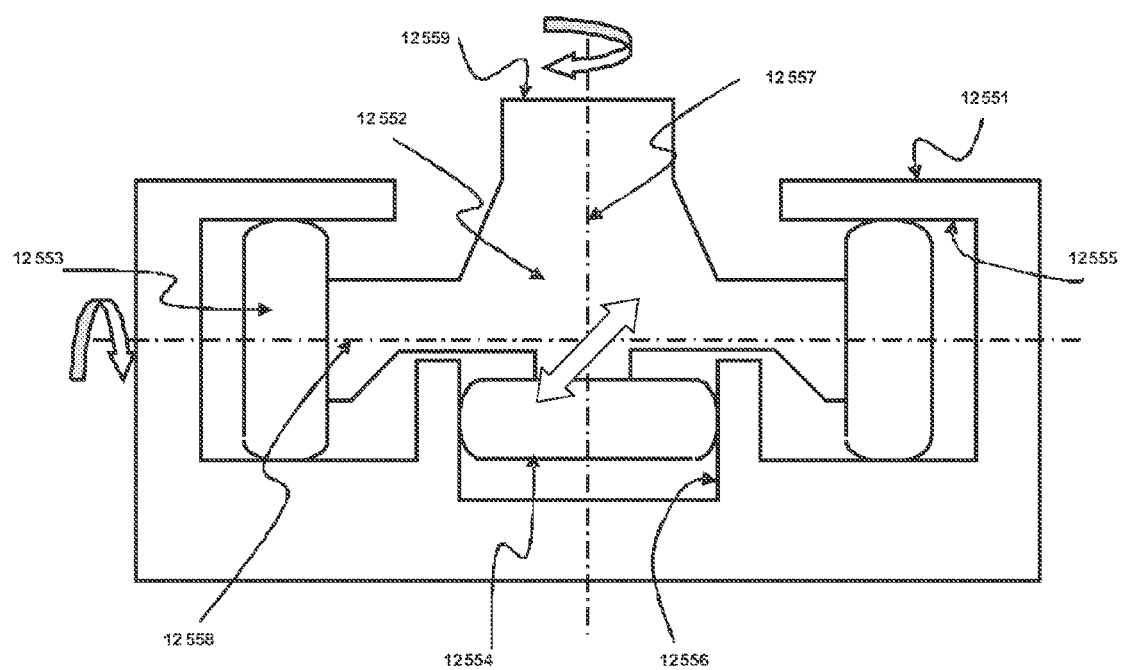

FIG. 5 shows a guiding system of a carriage (12552) according to the invention incorporated in a frame (12551), said frame being disposable on the actuated support (1255) according to FIG. 4b.

The system for guiding the carriage (12552) in the frame (12551) thus has the following characteristics:
the frame (12551) is provided with three parallel linear guiding tracks (12555, 12556), the first track (12556) extending centrally on the frame and a second and third track (12555) being disposed laterally to the first track,
the carriage (12552) has at least two axes of rotation (12557, 12558), a first axle (12557) driving at least one first wheel (12554) in the first guiding track (12556) and a second axle (12558) driving at least one second and at least one third wheel (12553) in the second and third guiding track (12555) respectively,
the two axes of rotation (12557, 12558) are perpendicular.

In this way, all the desired degrees of freedom are advantageously achieved (double vertical/horizontal pivoting of the carriage about the axes of rotation—such as a local ball-joint effect—and horizontal linear guiding in the direction of a strip edge).

The invention can provide that the two axes of rotation (12557, 12558) are exactly intersecting, which facilitates the double pivoting of the carriage relative to the frame about a single axis, but also about two axes simultaneously.

In greater detail, the guiding system provides that
each guiding track comprises a bottom and two sides,
said sides are parallel to the axis of rotation of the wheel moved in said guiding track
the wheel linked to the axis of rotation consequently has at least part of its circumference in contact with or stopped by one of the sides of the track.

In particular, the second and third wheels (12553) each roll with a small amount of play in a guiding space (12555) where they are free to pivot about the axis (12557) of the first wheel (12554).

The first wheel (12554) rolls with a small amount of play in a guiding space (12556) where it is free to pivot about the axis (12558) of the other second and third wheels (12553).

To achieve this, the wheels have diameters less than a spacing between the guiding track sides such that there is play between each wheel and its guiding track.

As mentioned above, the axes of rotation (12557, 12558) are interlocked on the carriage such that the first wheel (12554) is able, between the two sides of its guiding track (12556), to pivot about the second axis of rotation (12558) driving the second and third wheel. Analogously, the axes of rotation (12557, 12558) are interlocked on the carriage such that the second and the third wheel (12553) are able, between the sides of their respective guiding tracks, to pivot about the axis of rotation of the first wheel (12554).

As indicated by the arrows in FIG. 5, the guiding system therefore offers three movement possibilities (with four degrees of freedom with respect to the support 1225 of FIG. 4b) which can also be dynamically simultaneous
Linear displacement following an axis perpendicular to the axes (12557) and (12558),
Pivoting about the first axis (12557),
Pivoting about the second axis (12558).

Instead of a single wheel per guiding track, the guiding system can provide that at least one of the three wheels is split into two wheels disposed side by side and having distinct and parallel axes of rotation such that each of said two wheels shall be in contact with one of the sides of the guiding track. This can enable excessive play between wheel and guiding track of the wheel to be prevented. To facilitate the implementation of a system with 3×2 wheels instead of 3 single wheels, the wheels (at least 1 out of 2 of each pair) are designed to be adjustable in the cross direction of the guiding tracks in order to make better contact with the track side.

FIGS. 6 and 7 show typical configurations of the guiding system, i.e. as a function of the positioning of the supports of one of the air jet wiping beams according to FIGS. 4*a* and 5.

Figure 6A:
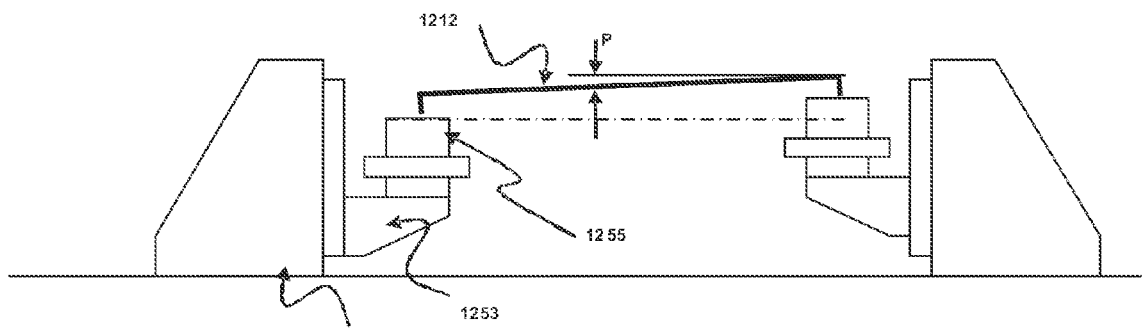
Figure 6B:
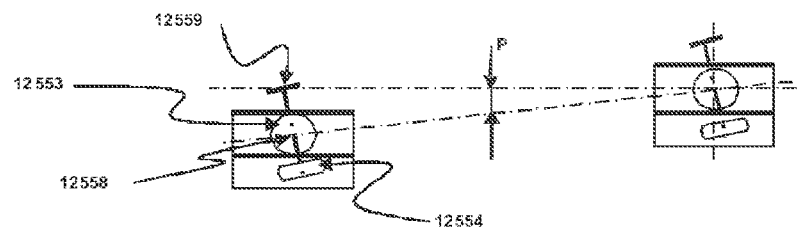
Figure 7A:
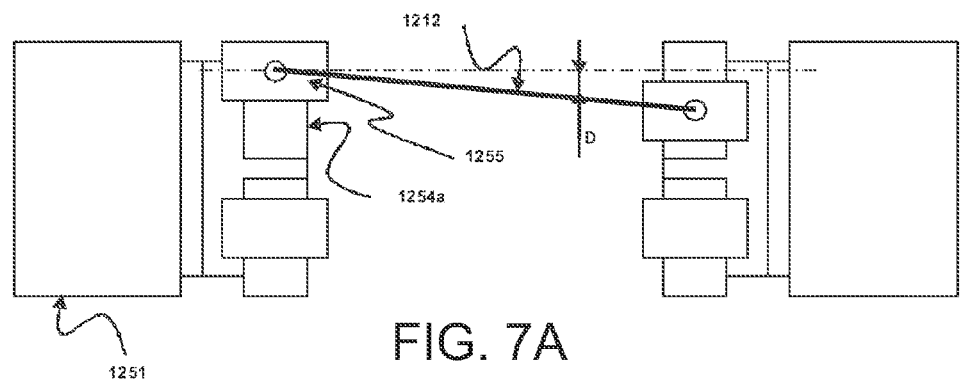
Figure 7B:
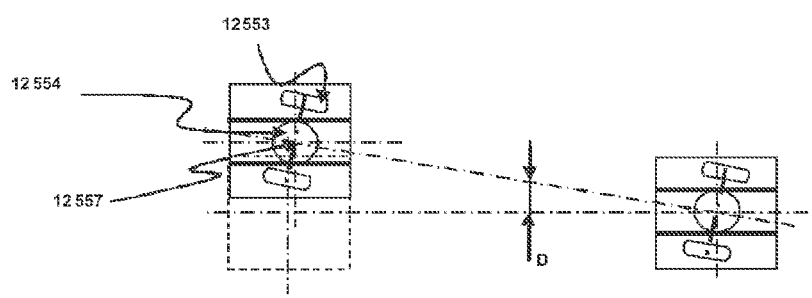

FIGS. 6*a*, 6*b* illustrate the guiding system according to the invention in beam inclination (slope) mode in two side views. FIGS. 7*a*, 7*b* illustrate the guiding system according to the invention in beam deviation mode in two top views.

In FIG. 6*a*, the two vertical displacement tables (1252) place the bases (1253) and the associated supports (1255) at two different heights, thereby imparting an inclination or slope (P) to the beam (1212). FIG. 6*b* shows that said first wheel (12554) of each support pivots about said second axis (12558) of the two other associated wheels (12553). The carrying planes (12559) of the beam (1212) are aligned to the slope angle (P) of said beam. Not shown but possible, linear guiding of the beam ends along the surface of the strip is also made possible if the first axis (12557) of each carriage on the supports (1255) must be translated toward or away from the strip edges.

In FIG. 7*a*, the two horizontal displacement tables (1254*a*) place the supports (1255) in two positions constituting a (horizontal) deviation angle (D) of the beam (1212) with respect to the axis of symmetry of the beam supports (1251). FIG. 7*b* shows that the second and third wheels (12553) of each support pivot about the vertical axis (12557) of the first associated wheel (12554). The axes (12557) are aligned to the deviation angle (D) of the beam (1212).

The invention claimed is:

1. A system for guiding a carriage in a frame, which comprises:
    a frame formed with three mutually parallel, linear guiding tracks, said guiding tracks including a first guiding track extending centrally on said frame, and second and third guiding tracks disposed laterally of said first guiding track;
    a carriage having at least two axes of rotation, including a first axis defining a rotation of a first wheel running in said first guiding track and a second axis defining a rotation of at least one second wheel and at least one third wheel running in said second and third guiding tracks, respectively;
    said at least two axes of rotation extending perpendicular to one another;
    each said guiding track comprising a bottom and two sides, and said sides being parallel to an axis of rotation of the respective said wheel driven in the respective said guiding track.

2. The system according to claim 1, wherein said at least two axes of rotation intersect one another.

3. The system according to claim 1, wherein said axes of rotation are interlocked on said carriage, to enable said first wheel, between said two sides of said first guiding track, to pivot about said second axis of rotation driving said second and third wheels.

4. The system according to claim 1, wherein said axes of rotation are interlocked on said carriage, to enable said second and third wheels, between the sides of said second and third guiding tracks, respectively, to pivot about the axis of rotation of said first wheel.

5. The system according to claim 1, wherein said wheels have diameters less than a spacing between said sides of said guiding tracks leaving play between each wheel and the associated said guiding track.

6. The system according to claim 1, wherein at least one of said three wheels is split into two wheels disposed side by side and having distinct and parallel axes of rotation, with each of said two wheels being in contact with one of the sides of said guiding track.

7. A method for guiding one end of a beam moving three-dimensionally, the method which comprises providing the system according to claim 1, rigidly fixing the one end of the beam to the carriage of the system, and guiding the one end by way of the carriage moving along the guiding track.

8. The method according to claim 7, which comprises providing a second carriage and guiding another end of said beam rigidly affixed to the second carriage.

9. The method according to claim 8, wherein the ends are ends of wipers constituting two distinct beams for air jet or electromagnetic field wiping either side of a continuous strip, and the method comprises moving the carriages and their respectively fixed carriages by way of a plurality of independent actuators providing vertical height adjustment, horizontal adjustment perpendicular to a plane of the strip and horizontal adjustment parallel to the plane of the strip.

* * * * *